(12) United States Patent
Rosenblum et al.

(10) Patent No.: US 7,685,105 B2
(45) Date of Patent: Mar. 23, 2010

(54) SYSTEM AND METHOD FOR INDEXING, ORGANIZING, STORING AND RETRIEVING ENVIRONMENTAL INFORMATION

(75) Inventors: Eric Rosenblum, San Jose, CA (US); Richard W. Harris, Berkeley, CA (US); Lawrence F. Byers, Palo Alto, CA (US)

(73) Assignee: Envirospectives, Inc., San Jose, CA (US)

( * ) Notice: Subject to any disclaimer, the term of this patent is extended or adjusted under 35 U.S.C. 154(b) by 607 days.

(21) Appl. No.: 11/058,752

(22) Filed: Feb. 14, 2005

(65) Prior Publication Data
US 2006/0047692 A1    Mar. 2, 2006

Related U.S. Application Data

(63) Continuation-in-part of application No. 10/117,361, filed on Apr. 5, 2002, now Pat. No. 6,856,907.

(60) Provisional application No. 60/282,302, filed on Apr. 5, 2001.

(51) Int. Cl.
*G06F 7/00* (2006.01)
*G06F 17/30* (2006.01)
(52) U.S. Cl. .......................... 707/3; 709/203
(58) Field of Classification Search .............. 707/2, 707/3, 4, 5; 702/2, 5; 703/5
See application file for complete search history.

(56) References Cited

U.S. PATENT DOCUMENTS

| | | | |
|---|---|---|---|
| 5,321,613 A | 6/1994 | Porter et al. | |
| 5,654,886 A | 8/1997 | Zereski, Jr. et al. | |
| 5,808,916 A | 9/1998 | Orr et al. | |
| 5,815,417 A | 9/1998 | Orr et al. | |
| 5,831,876 A | 11/1998 | Orr et al. | |
| 5,978,804 A * | 11/1999 | Dietzman | 707/10 |
| 6,064,943 A | 5/2000 | Clark, Jr. et al. | |
| 6,292,830 B1 | 9/2001 | Taylor et al. | |
| 6,332,155 B1 | 12/2001 | Notani | |
| 6,334,146 B1 | 12/2001 | Parasnis et al. | |
| 6,341,287 B1 | 1/2002 | Sziklai et al. | |
| 6,370,573 B1 * | 4/2002 | Bowman-Amuah | 709/223 |

(Continued)

OTHER PUBLICATIONS

USDA Integrated Taxonomic Information System (ITIS), "ITIS Taxonomic Workbench User's Guide Version 1.12" [online], Oct. 1996, USDA, < URL: http://www.itis.usda.gov/twb_ug.pdf>, pp. 19.*

(Continued)

*Primary Examiner*—Mohammad Ali
*Assistant Examiner*—Angelica Ruiz
(74) *Attorney, Agent, or Firm*—Robert C. Rolnik; Mark Thomas

(57) ABSTRACT

Embodiments of the present invention provide indexing, organizing, storing and/or retrieving of environmental information regarding a proposed environment-modifying project, including information about an environment-modifying natural event or construction project ("project"); a natural, constructed or socioeconomic feature in the area of the project ("setting"); a change to the setting brought about by the project ("impact"); or a feature designed to ameliorate a potential environmental impact of the project ("mitigation"). The environmental information is indexed with metadata that may be hierarchically organized and made available to a reviewer in a controlled vocabulary or a user-defined vocabulary.

19 Claims, 14 Drawing Sheets

Structure of Primary and Secondary Databases and User Interface

U.S. PATENT DOCUMENTS

| | | | |
|---|---|---|---|
| 6,546,388 B1 * | 4/2003 | Edlund et al. | 707/5 |
| 6,678,692 B1 * | 1/2004 | Hyatt | 707/102 |
| 2002/0026339 A1 * | 2/2002 | Frankland et al. | 705/7 |
| 2002/0035550 A1 | 3/2002 | Sakurai et al. | |
| 2002/0042731 A1 | 4/2002 | King et al. | |
| 2003/0014342 A1 | 1/2003 | Vande Pol | |
| 2004/0006566 A1 | 1/2004 | Taylor et al. | |

OTHER PUBLICATIONS

Dublin Core Metadata Initiative (DCMI), "Dublin Core Metadata Element Set, version 1.1: Reference Description" (2004),website, http://dublincore.org/documents/dces/.

USGS Geographic Names Information System (GNIS), "GNIS Data Users Guide 6" (1995), website, http://geonames.usgs.gov/gnis_users_guide_toc.html.

USGS National Biological Inventory Infrastrucuture (NBII), "NBII Biocomplexity Thesaurus" (2002), website, http://thesaurus.nbii.gov/SearchNBIIThesaurus/about.faces.

USDA Integrated Taxonomic Information System (ITIS), "ITIS Taxonomic Workbench User's Guide version 1.12" (1996), website, http://www.itis.usda.gov/twb_ug.pdf.

US Commerce Dept. National Environmental Data Index (NEDI), "Report to the Committee on Natural and Environmental Resources" (1997) http://www.nedi.gov/nedi_report.html.

California Office of Planning and Research (OPR), "California Environmental Resource Evaluation System (CERES)" (2001), website, www.ceres.ca.gov.

California Office of Planning and Research, "Land Use Planners Information Network (LUPIN)" (2001), website, http://ceres.ca.gov/planning/ead/.

California Office of Planning and Research, "CEQAnet" (2001), website, http://www.ceqanet.ca.gov/default.htm.

California Environmental Resources Evaluation System (CERES),"California Environmental Information Catalog", website, http://gis.ca.gov/catalog/.

California Office of Planning and Research, "The CERES/NBII Thesaurus Partnership Project" (2003), website, http://ceres.ca.gov/thesaurus/.

Gutierraz, A.; Non-Final Office Action; Date: Oct. 9, 2003; U.S. Appl. No. 101117,361; USPTO.

Gutierraz, A.; Non-Final Office Action; Date: Apr. 4, 2004; U.S. Appl. No. 10/117,361; USPTO.

Gutierraz, A.; Notice of Allowance; Date: Oct. 8, 2004; U.S. Appl. No. 10/117,361; USPTO.

Planning Design and Construction Office of the University of California, Office of the President; UC CEQA Handbook; Jul. 17,1991; pp. 1-239; The Planning, Design and Construction Office University of California, Oakland, Ca (Split NPL Document due to large file size: uploaded (1 of 2) pp. 1-121).

Planning Design and Construction Office of the University of California, Office of the President; UC CEQA Handbook; Jul. 17,1991; pp. 1-239; The Planning, Design and Construction Office University of California, Oakland, Ca (Split NPL Document due to large file size: uploaded (2 of 2) pp. 122-239).

PLACE3S; The Energy Yardstick: Using PLACE3S to Create More Sustainable Communities; Whitepaper; Aug. 1996; pp. 1-166; PLACE3S (Split NPL Document due to large file size: uploaded (1 of 2) pp. 1-82).

PLACE3S; The Energy Yardstick: Using PLACE3S to Create More Sustainable Communities; Whitepaper; Aug. 1996; pp. 1-166; PLACE3S (Split NPL Document due to large file size: uploaded (2 of 2) pp. 83-166).

Mckeever, M.; Common Values, Information and Analytical Needs of Sustainable Communities, Healthy Communities, and Civic Engagement Initiatives; Whitepaper; Feb. 2, 1999; pp. 1-6; Tools for Community Design and Decision Making; http://www.placematters.us/TCDDMV.

Stockwell, D.; An Interface between Computing, Ecology and Biodiversity: Environmental Informatics; Research Review; Oct. 1999; pp. 1-14; LTER Seoul Conference.

Lavigne, M.; E-Government: Creating Tools of the Trade; Article; Oct. 2000 ; pp. 1-3; Center for Technology in Government, University at Albany, Suny.

Haklay, M.; onceptual Models of Urban Environmental Information Systems—Towards Improved Information Provision; Oct. 2001; pp. 1-37; Centre for Advanced Spatial Analysis.

Chesky, L.; Reality Check: Monterey County's electronic community proves we can't have it all; Article; Mar. 22, 2001; pp. 1-2; Coast Weekly Monterey County, California.

USEPA Office of Research and Development; User Guide and Data Administration Guidelines for the USEPA's Environmental Information Management System (EIMS); Paper; Oct. 2001; pp. 1-281; Version 1.3; USEPA Office of Research and Development (Split NPL Document due to large file size: uploaded (1 of 2) pp. 1-146).

USEPA Office of Research and Development; User Guide and Data Administration Guidelines for the USEPA's Environmental Information Management System (EIMS); Paper; Oct. 2001; pp. 1-281; Version 1.3; USEPA Office of Research and Development (Split NPL Document due to large file size: uploaded (2 of 2) pp. 147-281).

Thompson, D.; Web-Based Environmental Information Management Systems; Symposium; Nov. 14, 2001; pp. 1-9; Civil and Environmental Consultants, Inc. Pittsburgh, PA.

Unruh, G.; Can the Internet Help Slow Global Decline?; Nov. 2001; pp. 1-16; vol. 6, No. 11; First Monday.

California Department of Transportation Project Development Workflow Tasks (PDWT); Guidelines for the Preparation of Project Study Reports; Dec. 8, 1999; pp. 1-8; California Department of Transportation Project Development Workflow Tasks (PDWT).

Fulcher, C.; Economic and Environmental Impact Assessment Using a Watershed Management Decision Support Tool; 1997; pp. 1-23; University of Missouri, Columbia, MO.

* cited by examiner

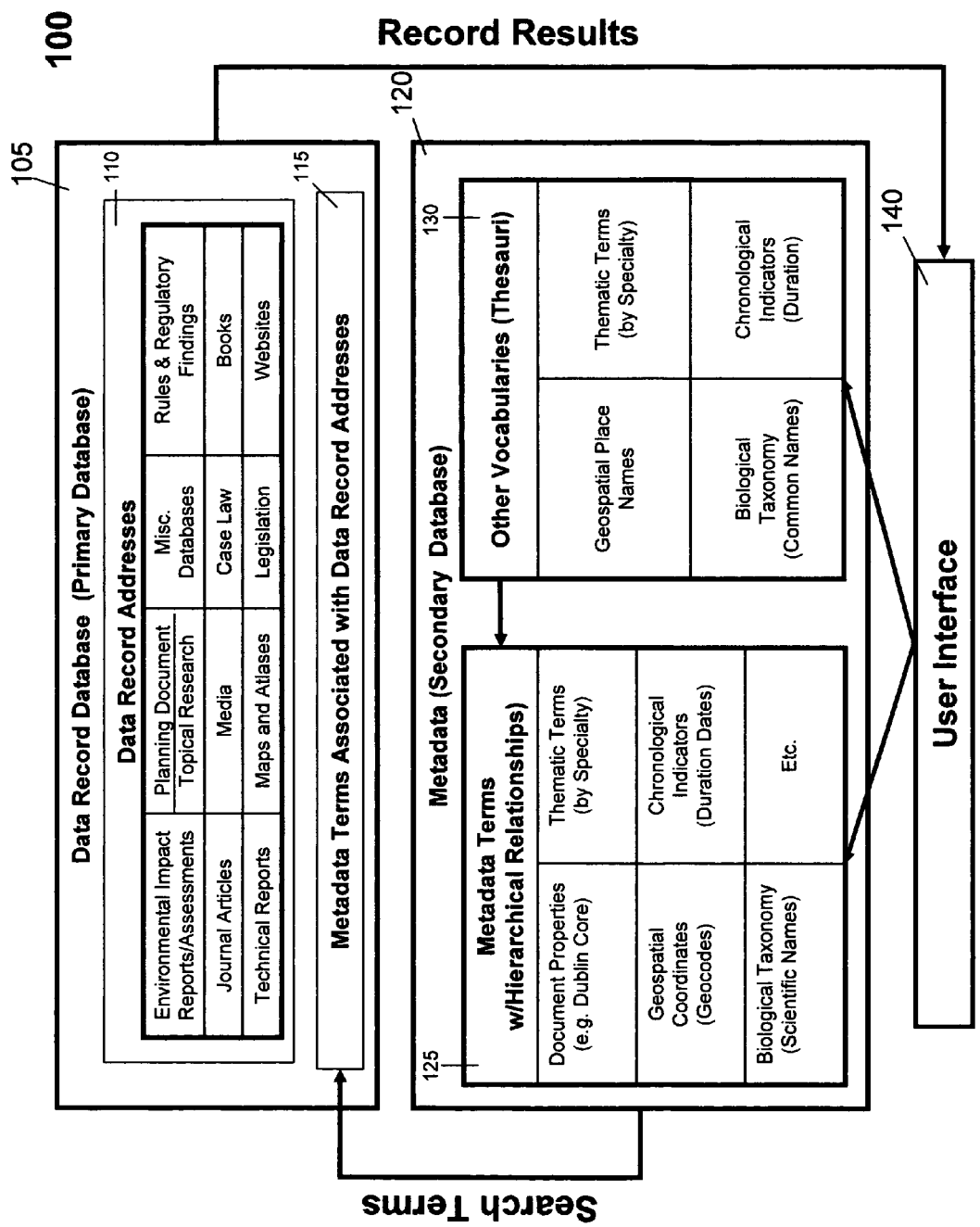
Figure 1. Structure of Primary and Secondary Databases and User Interface

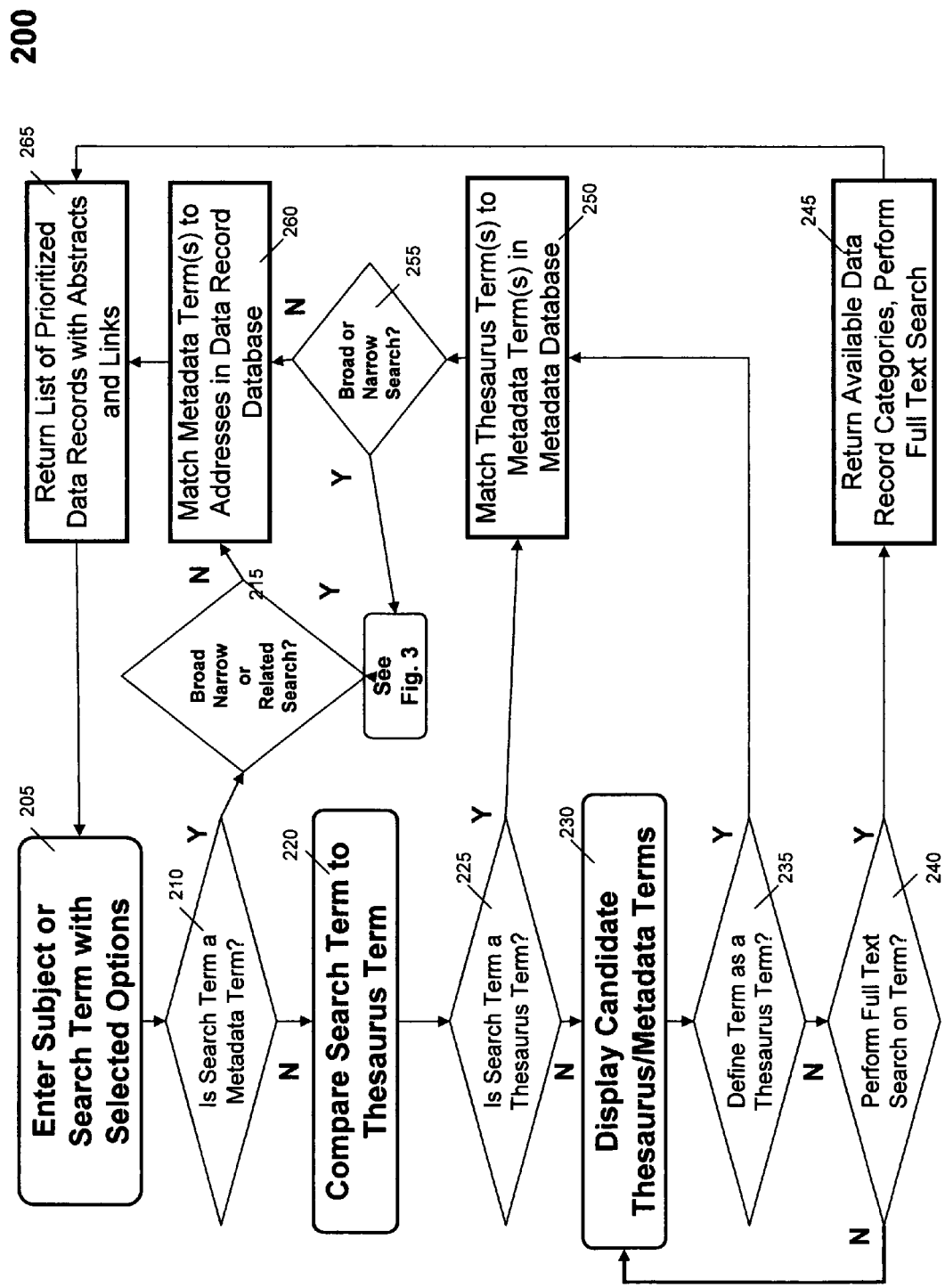
Figure 2. Flow Chart of Search Using Metadata or Thesaurus Search Terms

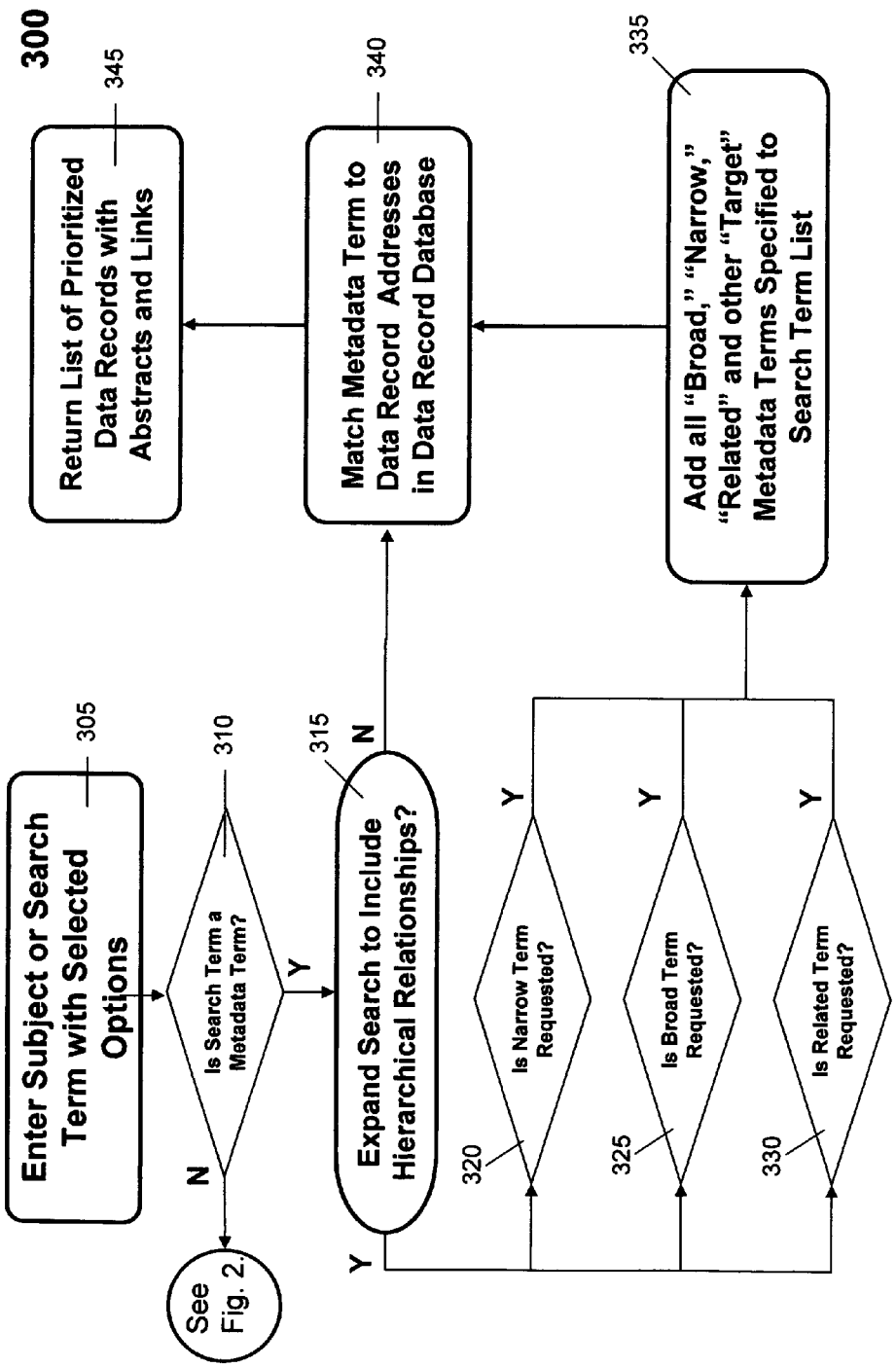
Figure 3. Flow Chart of Search Including Hierarchical Metadata Relationships

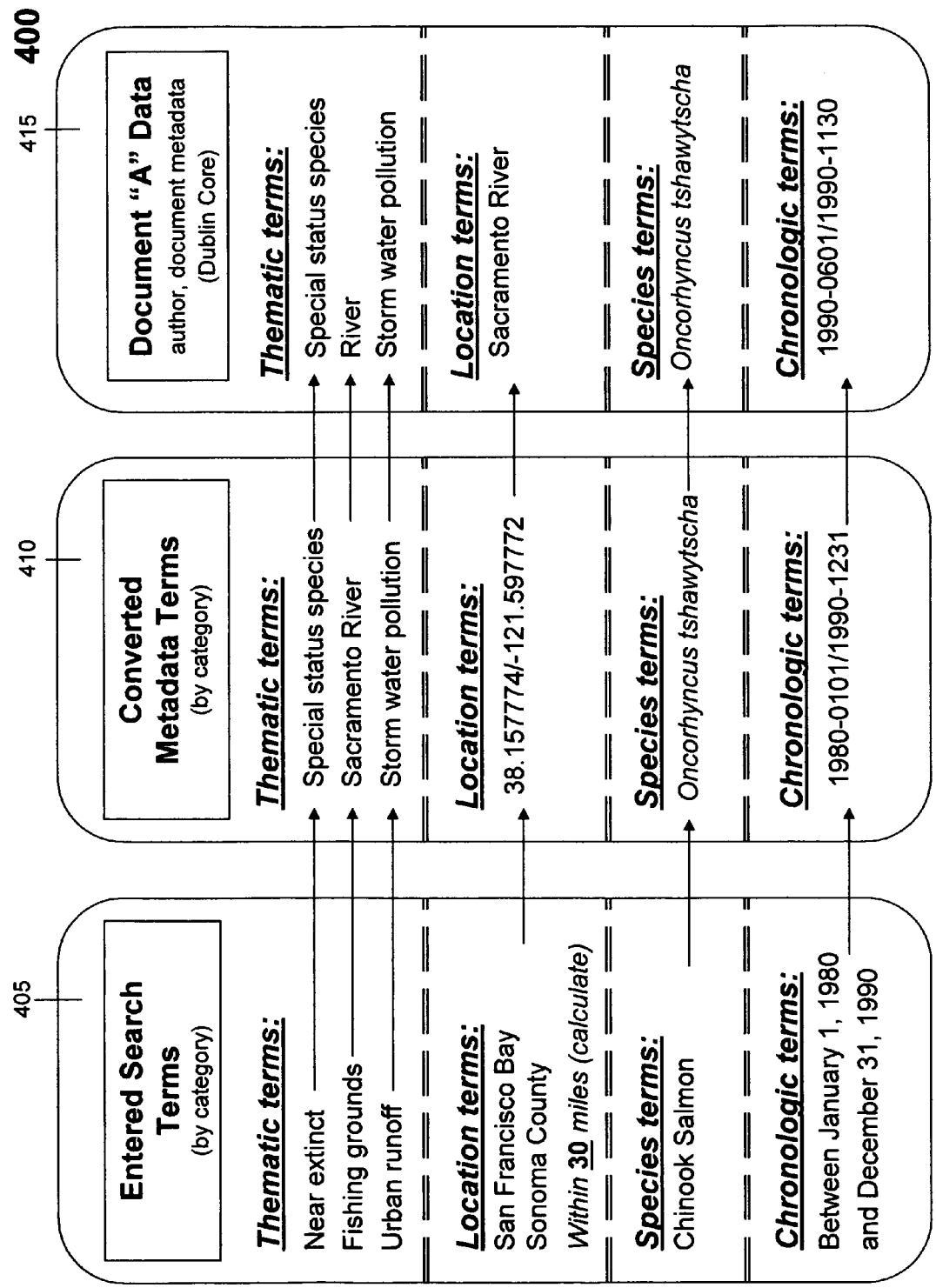
Figure 4. Example Search Schematic No. 1

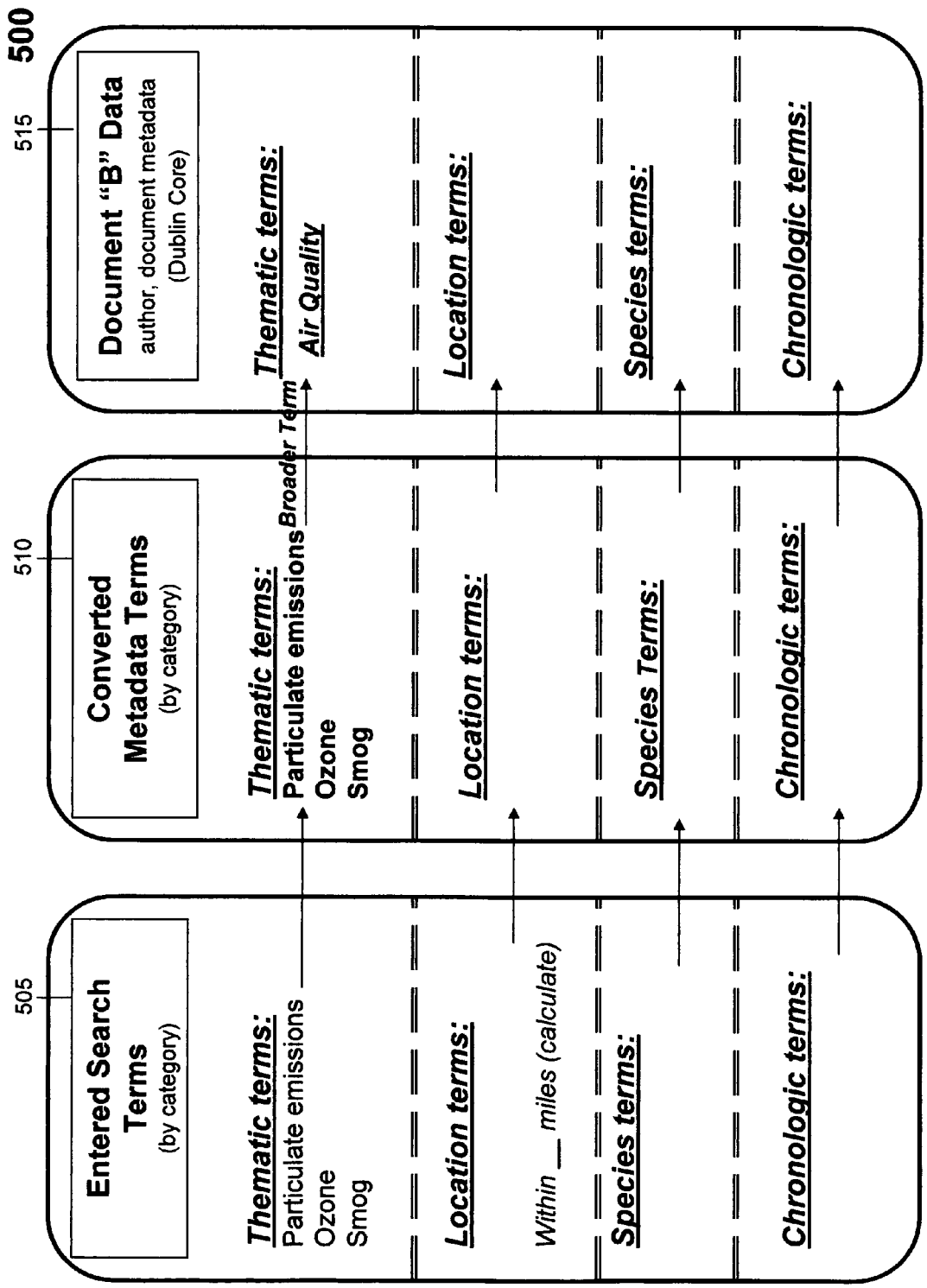
Figure 5. Sample Broad and Narrow Term Search Schematic No. 2

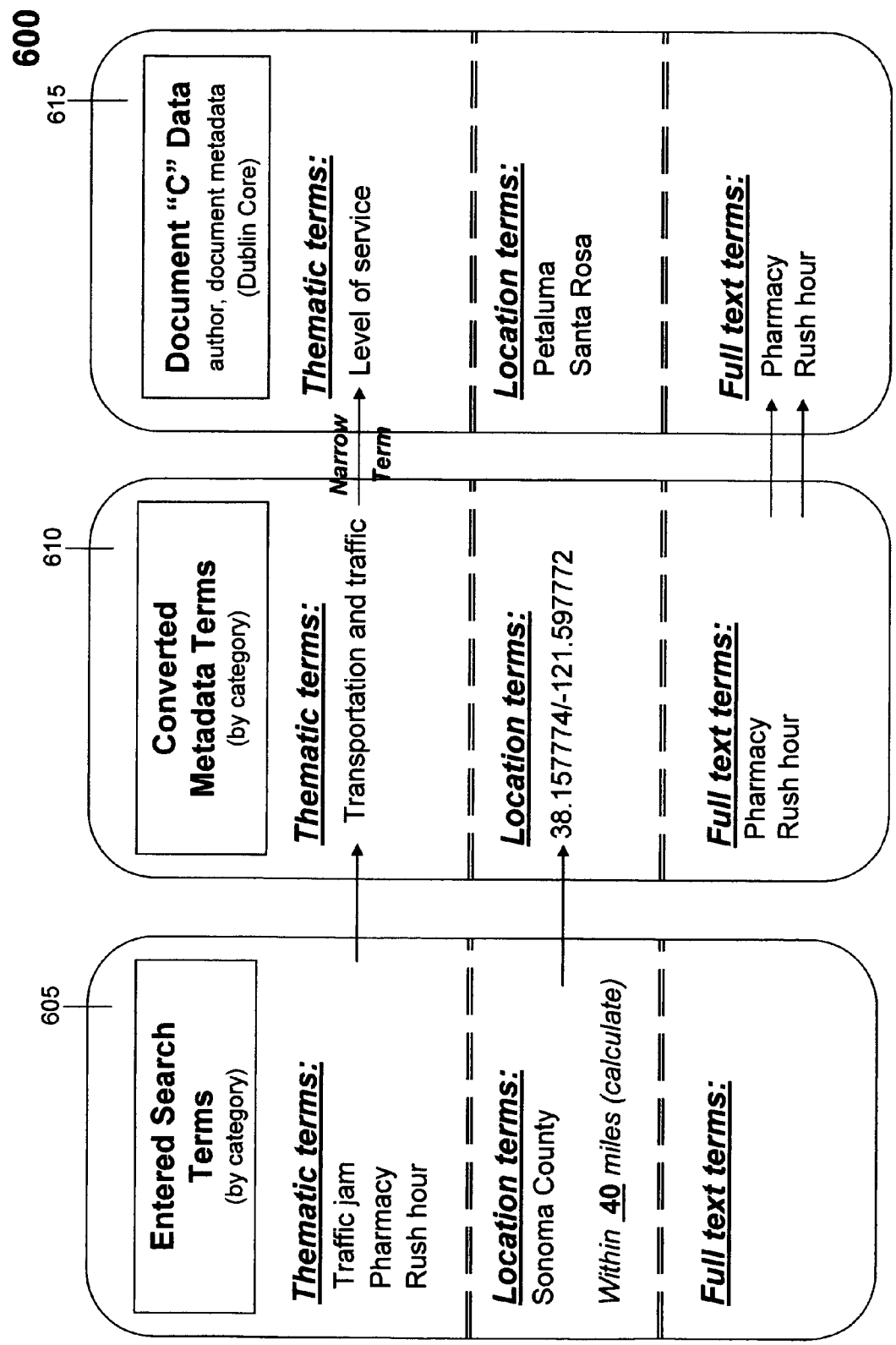
Figure 6. Example Search Schematic No. 3

Subject or Document Type   ▼
                               735

Search Term(s)   ▼      ☐ Advanced Search 725                              730
                                    Drop down menu: Suggested (pre-formatted)
                                    metadata search terms from subject categories ☒ Search Metadata Term Only
☒ Search with Relationships (check all that apply)

☒ Broad Terms        [          ]
☒ Narrow Terms       [          ]
○ Related Terms      [          ]

☒ Include Thesaurus Terms

○ Metadata Terms        ○ Other Terms
○ Location Terms        ☒ All Terms
○ Species Terms         ○ Full Text

705

Location [ San Francisco Bay, Sonoma County ]
                                                  710
*Within* [ 30 ]  ☒ *Mi.*  ☐ *Km.*

715
Date
Earlier Than    [          ]
Later Than      [          ]
On Date         [          ]
Between Dates   [ Jan 01, 1980 - Dec 31, 1990 ]

Return Results As:
☒ Prioritize Results
☐ Organize Results

○ By File Type
○ By Date
☒ By Data Record Type  [Environmental Impact Report, Technical Report, etc.]
○ By Location

720

700

Figure 7. Example Search Term Entry Screen

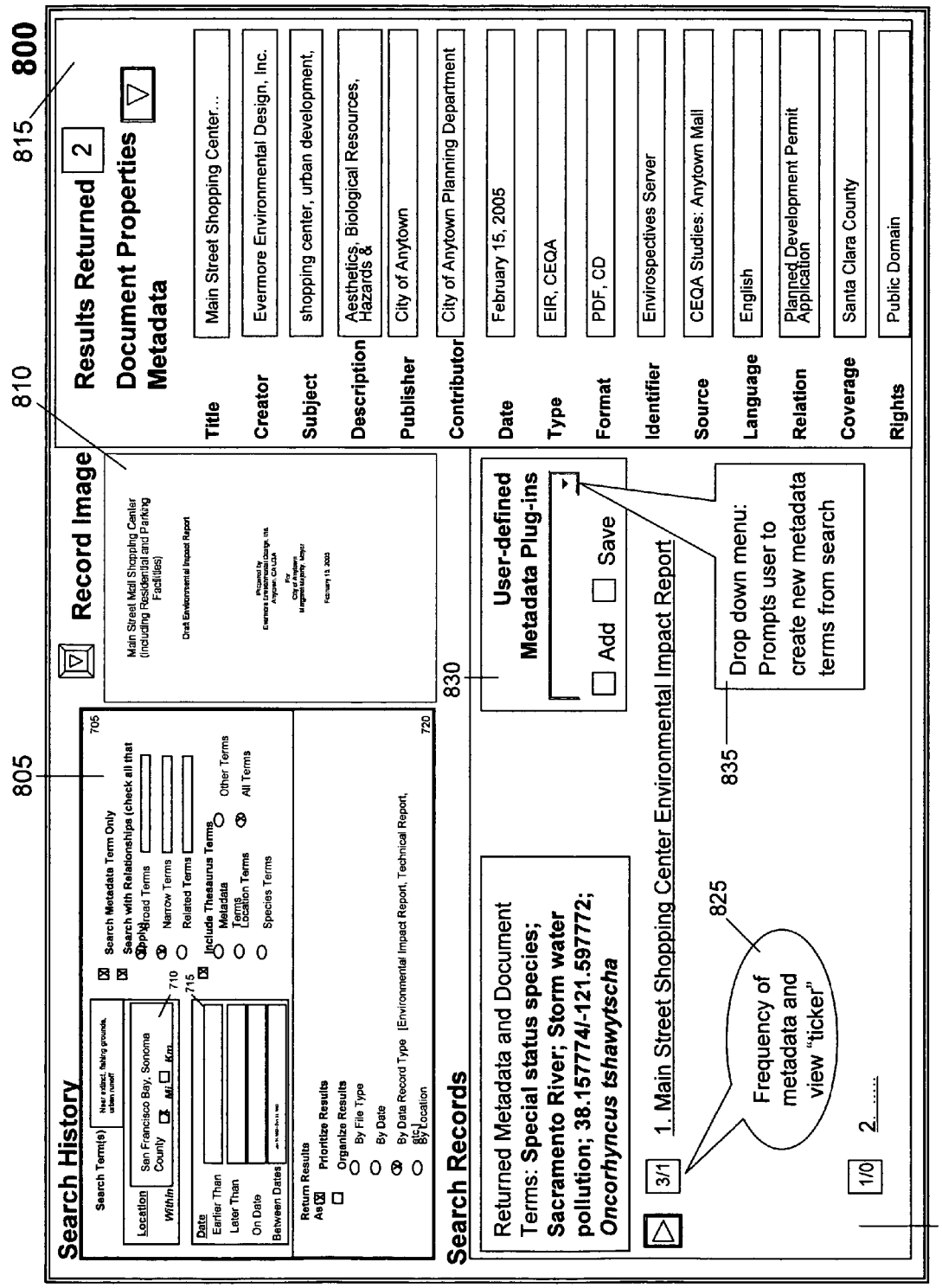
Figure 8. Example Search Results (Return) Screen

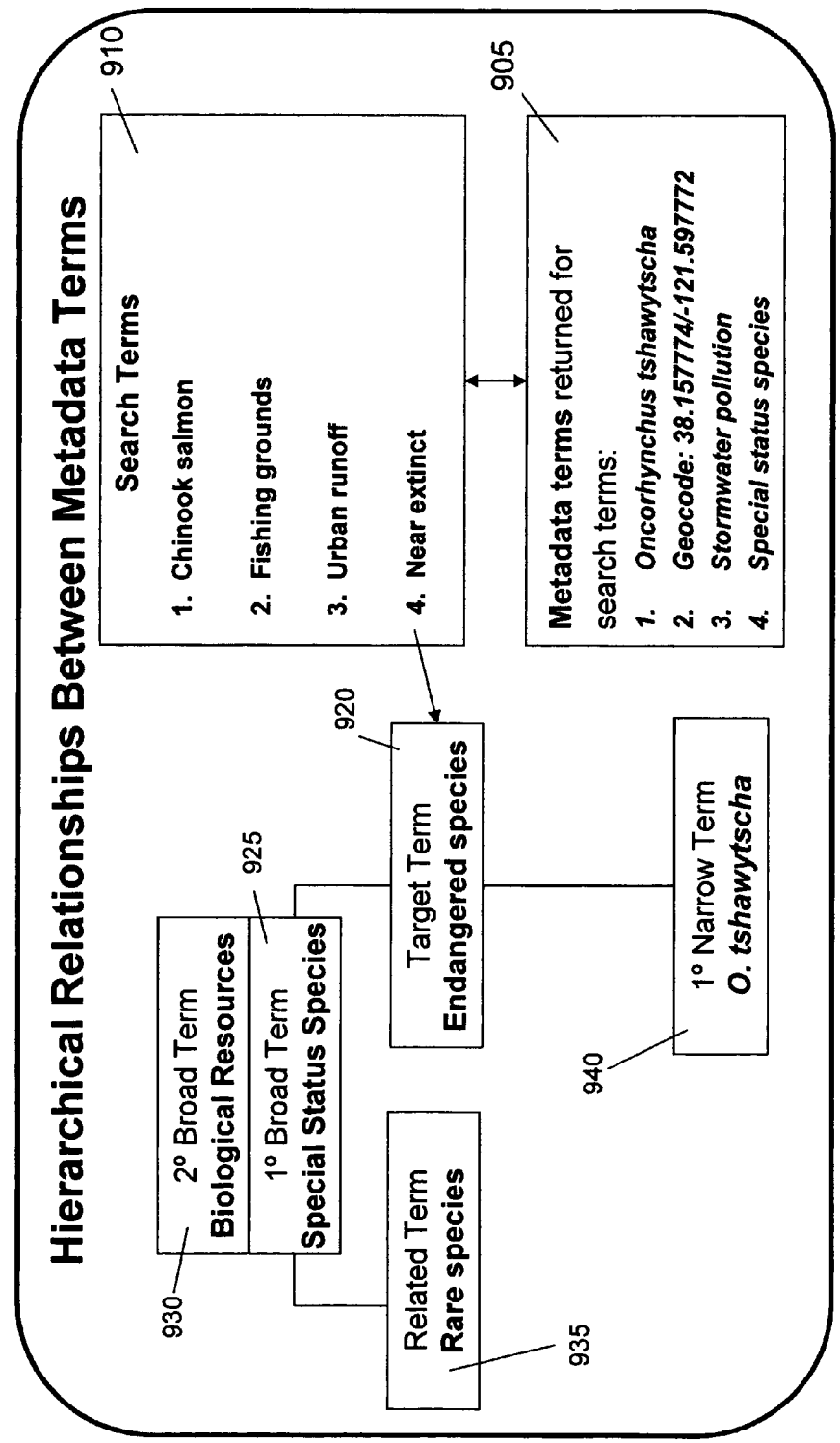
Figure 9. Thesaurus Structure Showing Hierarchical Relationship Between Terms

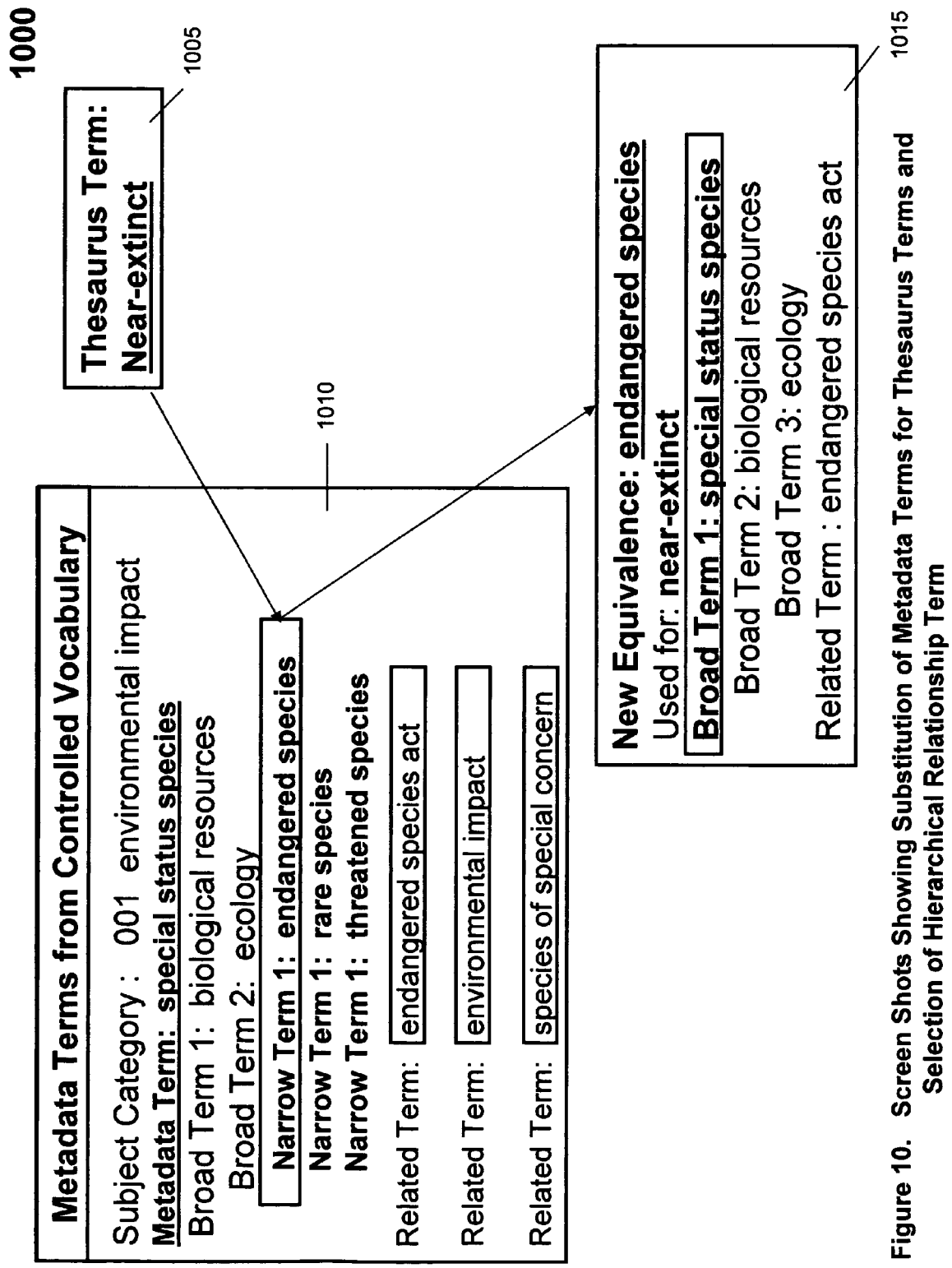
Figure 10. Screen Shots Showing Substitution of Metadata Terms for Thesaurus Terms and Selection of Hierarchical Relationship Term

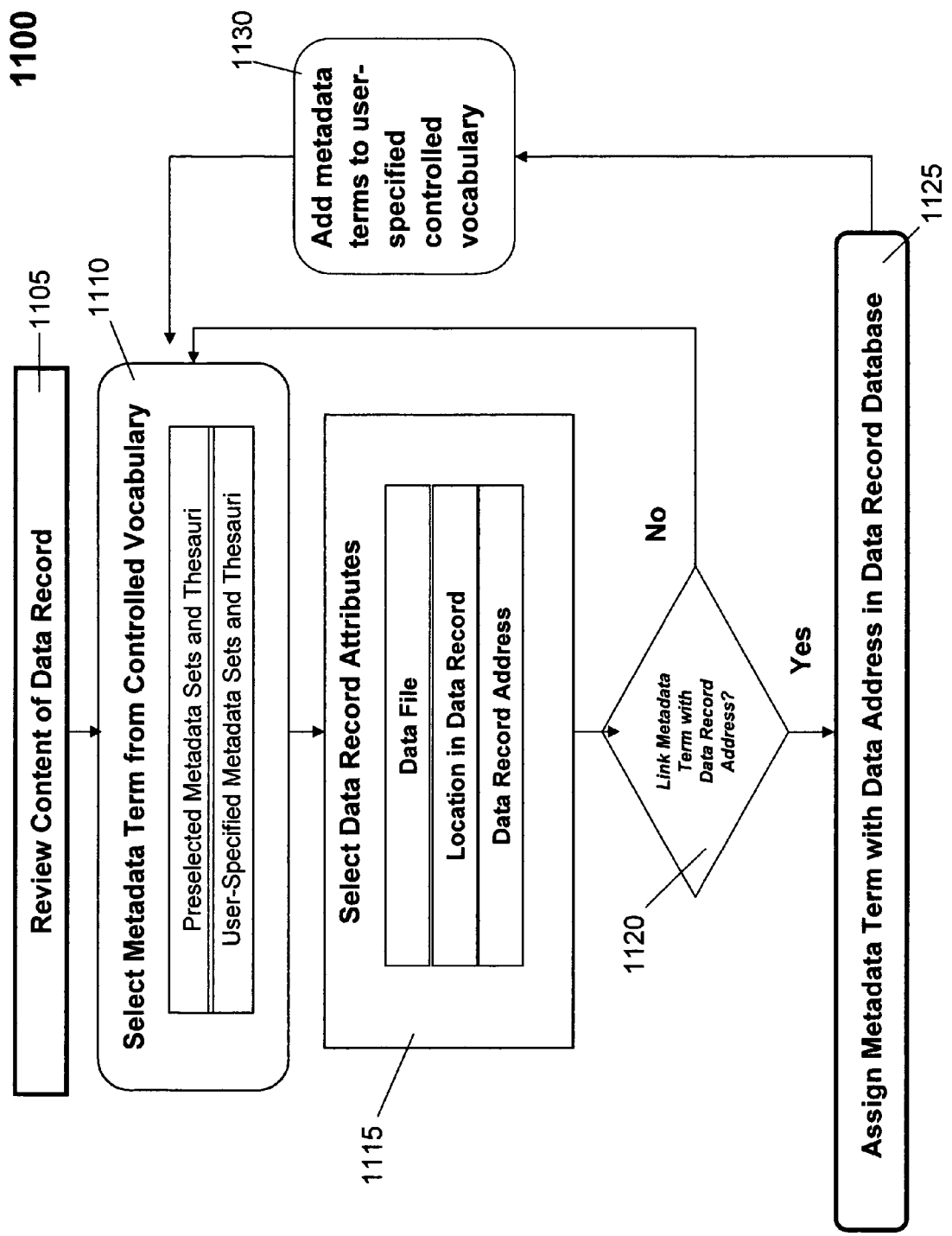
Figure 11. Flow Chart of Metadata Assignment Tool

1200

- 1205
- 1215

Original Document [▼]
Original Document Date: [2/02/03] Imported? [▼]
Record Image 1210

Main Street Mall Shopping Center
(Including Residential and Parking
Facilities)

Draft Environmental Impact Report

Prepared by
Envirospectives, Inc.
San Jose, CA

For City of Anytown
Margaret Majority, Mayor

February 15, 2005

Metadata Plug-in Menu
Sample metadata selected from environmental impact report (more available)

Candidate Metadata

Document Properties (Data Record Metadata)

| Field | Value |
|---|---|
| Title | Main Street Shopping Center... |
| Creator | Evermore Environmental Design, Inc. |
| Subject | shopping center, urban development, |
| Description | Aesthetics, Biological Resources, Hazards & |
| Publisher | City of Anytown |
| Contributor | City of Anytown Planning Department |
| Date | February 15, 2005 |
| Type | EIR, CEQA |
| Format | PDF, CD |
| Identifier | Envirospectives Server |
| Source | CEQA Studies: Anytown Mall |
| Language | English |
| Relation | Planned Development Permit Application |
| Coverage | Santa Clara County |
| Rights | Public Domain |

Figure 12. Example Menu-Driven Metadata Assignment Screen #1

Figure 13. Example Menu-Driven Metadata Assignment Screen #2

1300

- 1305 Candidate Metadata
  - Chronological Indicators
  - Impact Level
  - Thematic Terms
  - Lifespan
  - Biological Taxonomy
  - Geospatial Coordinates
  - Related Links

- 1320

- 1325 Document Properties (Data Record Metadata)
  - Title
  - Creator
  - Subject
  - Description
  - Publisher
  - Contributor
  - Date

- 1330 Current List of Metadata Terms Assigned
  - Biological Taxonomy
  - Geospatial Coordinates
  - Thematic Terms
  - Chronological Indicators
  - Impact/Level
  - Air quality/High
  - Traffic/Medium/A-C

*Metadata Repository: Scrolling screen of terms assigned to file and vocabulary*

Original Document
Original Document Date: 2/02/03   Imported? ☑

- 1310
- Cover
- Table of Contents
- Preface
- Summary
- I. DESCRIPTION OF THE PROJECT
- II. ENVIRONMENTAL SETTING, IMPAC
  - A. LAND USE
  - B. POPULATION, JOBS A
  - C. GEOLOGY AND SOILS
    - Figure 12: Faults of Co
    - Table 3: Soils Present
  - D. HYDROLOGY AND WATER QUA
  - E. BIOLOGICAL RESOURCES
    - Figure 13: Tree Locations
    - Table 4: Ordinance-Size Trees on
  - F. HAZARDOUS MATERIALS
  - G. CULTURAL RESOU
  - H. TRANSPORTATION AN
  - I. AIR QUALITY
  - J. NOISE
  - K. VISUAL AND AESTHETIC

*Metadata Plug-in Menu: Sample metadata selected from environmental impact report (more available)*

*Information Tree showing a document template; users can create their own trees*

*Document Text showing text of document relating to location in table* — 1315

"and with the construction of the remaining buildings the total area available space will shrink from 25 acres to acres. However, the available pro open space has some habitat val near a creek and provides significant amenities for park use and recreation as well. The other factors of importance relative to overall land use for this project"

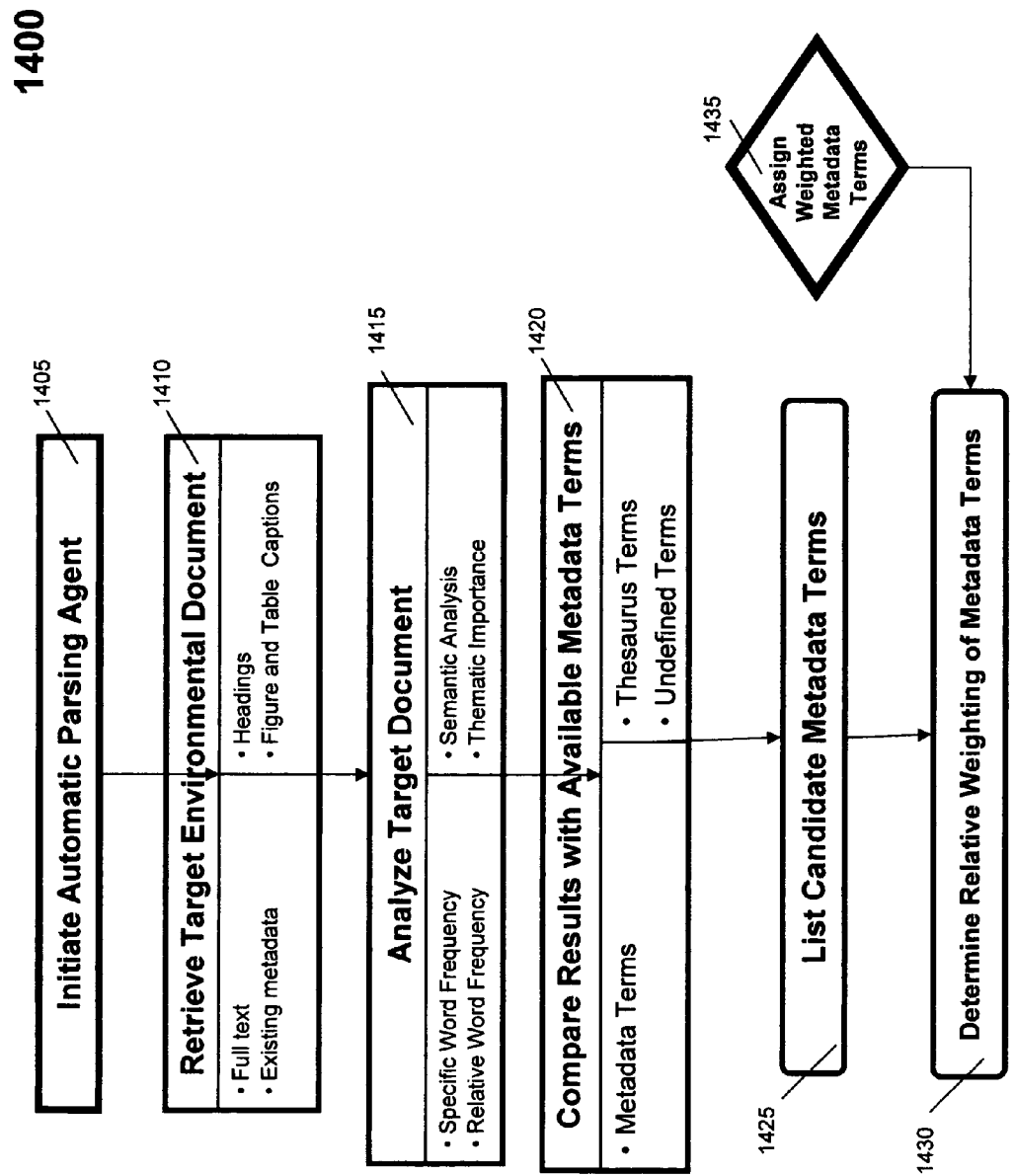
Figure 14. Metadata Assignment Schematic

SYSTEM AND METHOD FOR INDEXING, ORGANIZING, STORING AND RETRIEVING ENVIRONMENTAL INFORMATION

CROSS-REFERENCE TO RELATED APPLICATION(S)

This patent application is a continuation-in-part of, and claims the benefit to both, U.S. patent application Ser. No. 10/117,361, filed Apr. 5, 2002, now U.S. Pat. No. 6,856,907 and U.S. Provisional Patent Application 60/282,302, filed Apr. 5, 2001, both of which are hereby incorporated by reference in their entireties.

FIELD OF INVENTION

The present invention relates to an enhanced form of indexing, organizing, storing and retrieving environmental information.

BACKGROUND

A barrier to the efficient retrieval of stored environmental information is the difficulty to index the information with terms that are both uniquely and intuitively related to specific, relevant aspects of the data. In general, the more unique an indexing term is, the less intuitive it is, and the less convenient it is to researchers conducting the search. Conversely, the more intuitive a search term is, the more likely it is to be confused with other common terms and the less likely it is to return a unique category of records. For instance, common keywords used to search environmental information may be ambiguous as when the term "salmon" returns records referring to the color "salmon" instead of the fish.

To address these and other problems and to help ensure that users searching environmental documents receive accurate results, it is therefore desirable to provide a system and method for indexing, organizing, storing and retrieving environmental information to facilitate improved searches.

SUMMARY

Embodiments of the present invention provide indexing, organizing, storing and/or retrieving of environmental information regarding a proposed environment-modifying project, including information about an environment-modifying natural event or construction project ("project"); a natural, constructed or socioeconomic feature in the area of the project ("setting"); a change to the setting brought about by the project ("impact"); or a feature designed to ameliorate a potential environmental impact of the project ("mitigation").

Some embodiments of the present invention associate unique data records with one or more metadata terms from a controlled vocabulary (either preselected or user-specified) including environmental descriptors in a variety of useful categories (including but not limited to document properties, topic, location, date and species).

Some embodiments of the present invention, construct a database associating one or more descriptive pre-formatted or user-specified metadata terms to any unique data record.

Some embodiments of the present invention, assign metadata terms to environmental data records by selecting a source document, text, tabular, graphic or other data from any source and subsequently selecting appropriate metadata terms or values from a previously developed menu of metadata descriptors.

Some embodiments of the present invention provide a menu of metadata terms or values to characterize a given source or document in response to the type of environmental information it contains.

Some embodiments of the present invention automatically assign appropriate metadata identifiers to characterize environmental information in a given source or document based on the frequency of their occurrence.

In some embodiments of the present invention, some of the metadata terms describe locations for which the value of the metadata is provided in terms of geographic coordinates (i.e. geocodes).

In some embodiments of the present invention, some of the metadata terms describe a time period related to the information for which the value of the metadata is provided in terms of a date or set of dates.

Some embodiments of the present invention retrieve information by specifying search terms from a controlled vocabulary describing the desired data (metadata) and receiving a list of available data records prioritized according to the degree to which their metadata matches the entered search terms;

In some embodiments of the present invention, some of the environmental descriptors are hierarchically or thematically related to other descriptors in the controlled vocabulary of metadata to facilitate searches.

Some embodiments of the present invention locate indexed information by specifying search terms from a controlled metadata vocabulary and further specifying a type of relationship of associated metadata terms (e.g. "broad," "narrow," "used for" or "related") and receiving a list of available data records prioritized according to the degree to which their metadata matches the metadata associated with the entered search terms.

In some embodiments of the present invention, additional vocabularies (thesauri) are related to the controlled metadata terms in a Metadata Database to increase the likelihood that a given search will produce useful results.

In some embodiments of the present invention, a thesaurus of common species names is related to a controlled vocabulary of scientific names.

In some embodiments of the present invention, a thesaurus of common and specific place names is related to a controlled vocabulary of geocodes.

Some embodiments of the present invention, locate indexed information by specifying search terms from a thesaurus associated with a controlled metadata vocabulary and receiving a list of available data records prioritized according to the degree to which their metadata matches the metadata associated with the entered search terms. For example, the list of available data records may be prioritized according to the frequency with which the search terms match the metadata terms or terms in the text itself.

Some embodiments of the present invention, locate non-indexed information by entering search terms and receiving a list of available data records prioritized according to the frequency with which the search terms match the metadata associated with the data records through some other means, or the terms match the terms contained within the text of the data record itself.

Some embodiments of the present invention are performed by software stored in processor readable memory of a processing device communicatively coupled to the Internet.

These and other embodiments of the present invention, as well as other aspects and advantages are described in more detail in conjunction with the figures, the detailed description, and the claims that follow.

DESCRIPTION OF DRAWINGS

FIG. 1. Block diagram Structure of Primary and Secondary Databases and User Interface FIG. 2. Flow Chart of Search Using Metadata or Thesaurus Search Terms FIG. 3. Flow Chart of Search Including Hierarchical Metadata Relationships FIG. 4. Diagram Example Search Schematic No. 1;

FIG. 5. Diagram Example Broad and Narrow Term Search Schematic No. 2;

FIG. 6. Diagram Example Search Schematic No. 3;

FIG. 7. Diagram Example Search Term Entry Screen;

FIG. 8. Diagram Example Search Results (Return) Screen;

FIG. 9. Diagram Thesaurus Structure showing Hierarchical Relationship Between Terms;

FIG. 10. Diagram Screen Shots Showing Substitution of Metadata Terms for Thesaurus Terms and Selection of Hierarchical Relationship Term FIG. 11. Flowchart of Metadata Assignment Tool;

FIG. 12. Diagram Example Menu-Driven Metadata Assignment Screen Shot No. 1;

FIG. 13. Diagram Example Menu-Driven Metadata Assignment Screen Shot No. 2; and

FIG. 14. Metadata Assignment Schematic

DETAILED DESCRIPTION

Embodiments of the present invention disclose a system and method for indexing, organizing, storing and retrieving information regarding a proposed environment-modifying project is provided in some embodiments of the present invention. A system and method for assigning metadata to environmental information, and a system and method for relating search terms to a controlled vocabulary of metadata are also provided in embodiments of the present information.

Accordingly, researchers can more accurately access environmental information that is indexed with preselected or user-defined metadata terms. Furthermore, information searches are more likely to result in the return of data records that meet researcher needs, as compared to current keyword searches, when search terms from a thesaurus of common terms are associated with metadata terms that can be searched according to hierarchical and thematic relationships.

FIG. 1 illustrates the structure of the main components of the system and method for indexing, organizing, storing and retrieving information regarding a proposed environment-modifying project 100, which includes: 1) a data record database (or primary database) 105 that includes an address or location of one or more pieces of electronic and non-electronic information 110, each associated with one or more terms from a controlled vocabulary of specific metadata terms 115 that uniquely characterize the form and content of the data records; 2) a metadata database (secondary database) 120 associating various metadata terms from a controlled vocabulary 125 with thesaurus terms from one or more thesauri (vocabularies) 130 to which they are equivalent; and 3) a user interface 135 whereby researchers may enter search terms (either metadata terms or thesaurus terms) to query the primary database 105 and receive search results in the form of a list of data records with their addresses 110, and/or links to the data records.

As illustrated in FIG. 1, the database consists of the data record locations 110 for the various types of information, including but not limited to the following:

Planning Documents
Environmental Impact Reports (EIRs)
Journal Articles
Technical Reports
Topical Research
Media
Academic studies
Databases
Case Law
Legislation
Regulations and Regulatory Findings
Books
Websites
Maps and Atlases Data records may include electronic or non-electronic information. Electronic data records can be resident at a variety of locations, including storage on a single computer or on a server accessible through a private network, or on a website accessible through the internet. Non-electronic data records may be located at a public or private library or at a public or private office, access to which may be open or restricted.

The data record database 105 contains information sufficient to specify a unique location of each data record ("address") 110 such that the return of a data record's address 110 is sufficient to allow the user to locate the data record. In the case of electronic data, in some embodiments the address 110 is formatted in such a way that the address 110 changes automatically when the location of the electronic data moves so as to maintain an accurate register of data locations for the sake of retrieving the information for use by the researcher. In some embodiments of the present invention, the address of the data record returned to the user in response to a query of the database provides a link to the location of the data record which allows the user to access the information immediately by selecting the address.

The database also contains metadata terms that are associated with data records 115. Each unique data record is associated with any number of metadata terms 115 that describe the information in the data record. Metadata terms 115 are selected from a controlled vocabulary 125 in which each metadata term 115 is defined in a manner useful in characterizing the information in the underlying data record in an unambiguous manner.

The metadata terms 115 are contained in the secondary metadata database 120 which includes the controlled vocabulary of metadata terms in hierarchical relationships to one another 125 along with other lists of terms ("thesauri") 130 which are related to the metadata terms 115 as equivalent terms and for which one or more metadata terms 115 may be substituted during a search.

In some embodiments of the present invention, metadata terms 115 describe the bibliographic characteristics of the document as a whole, including standardized descriptions of documents and document properties (e.g. Dublin Core Metadata Initiative Metadata Terms) such as title, creator, subject, description, publisher, contributor, date, type, format, identifier, source, language, relation, coverage and rights. In some embodiments of the present invention, metadata terms 115 refer to the content of the information, including descriptions of its subject matter, location, range of dates covered and species discussed.

The use of the primary data record database 105 and the secondary metadata database 120 in enabling the user to search for information is illustrated in FIG. 2. In some embodiments of the present invention, a user enters a search term in step 205 along with various search parameters. The search term is then compared to a list of metadata terms 115 in the metadata database 120. If a match is found in step 210, the user is given the option in step 215 of broadening the search to include hierarchically related terms, as explained further in FIG. 3. If a broader search is not desired, the matched term is compared to the metadata terms 115 associated with data records in the data record database 105 in step 260, and the corresponding matched record addresses 110 are returned to the user with information about the available documents matching the greatest number or most heavily weighted terms in step 265.

If the search term entered by the user does not match any of the metadata terms 115 in the controlled vocabulary 125 in step 210, the search term is compared to a list of terms in other thesauri 130 in step 220 whose equivalence to the metadata 115 is listed in the metadata database 120. If a match is found in step 225, the matched thesaurus term is compared to the associated metadata terms in step 250, at which point the user is given the option in step 255 of broadening the search to include hierarchically related terms, as explained further in FIG. 3. If a broader search is not desired, the metadata terms are matched with the data records in the data record database 105 in step 260. As before, the matched records are returned to the user with information about the available documents matching the greatest number or most heavily weighted terms in step 265.

If the search term entered by the user does not match any of the other thesaurus terms in the metadata database 120, the user is offered the option of selecting an appropriate term to which the unknown search term may be associated in step 230. When the user selects an appropriate thesaurus term in step 235, the term is matched with its related metadata term 250, at which point the user is given the option in step 255 of broadening the search to include hierarchically related terms, as explained further in FIG. 3. If a broader search is not desired, the metadata terms are matched with the data records in the data record database 105 in step 260. As before, the matched records are returned to the user with information about available documents matching the greatest number or most heavily weighted terms in step 265.

If the user does not recognize any terms from the metadata database 120 as similar in significance to the unknown search term, the user may choose to perform a full text search with the search terms in step 240, at which point the unknown search term or terms will be compared to the readable text in the title and content of all documents in the data record database in step 245. Information about documents containing this search term will then be returned as search results to the user in step 265.

As shown in FIG. 3, in some embodiments of the present invention, the user may choose to broaden the search to include metadata terms hierarchically related to the metadata 115 associated with the search term. In step 305, a user enters a search term along with various search parameters. If the search term is not a metadata term in step 310, please refer to FIG. 2, however if the search term is a metadata term, proceed to step 315. In step 315 the user has the option to expand the search to include hierarchically related metadata terms. When a user selects this option in step 315, the metadata terms in the metadata database that are hierarchically related to the search term are reviewed, and those additional metadata terms having the appropriate relationship specified by the user in steps 320 through 330, narrow, broad, and related terms respectively, are added to the search terms in step 335, which are in turn compared with the metadata terms 115 in the data record database 105 in step 340.

Detailed examples of how the system and method described in FIGS. 2 and 3 might be implemented are illustrated in FIGS. 4 through 6. FIG. 4 shows how a user query for certain information can be translated into controlled metadata terms and yield documents from the primary database 105. In this example, the user searches for particular documents about the impact of water pollution on a type of salmon at stage 405 by entering the general search terms "Chinook salmon," "near-extinct," "fishing grounds," "urban runoff," in the user interface 140, none of which are metadata terms used to index documents directly. The search further specifies information concerning a period between 1980 and 1990 for a location within "30 miles of San Francisco Bay." These search terms are checked at stage 410 for equivalence with thesaurus terms and metadata terms in the metadata database 120 to yield the respective metadata terms O. tshawytscha for "Chinook salmon"; endangered species for "near extinct'; river for "fishing grounds"; storm water pollution for "urban runoff"; a chronological scalar 1980-0101/1990-1231 to signify the time period 1980 to 1990; and the geocode 38.157774/-121.597772 with an appropriate mathematical parameter to define "within 30 miles of San Francisco Bay." These metadata are then matched with the data records in the data record database 105 in stage 415 to locate a source of information (Document A) that has been characterized by metadata terms including.

FIG. 5 shows how a user query can be expanded by including a search for documents indexed with metadata terms that are hierarchically related to the initial search term by being broader or narrower than the initial term. In this example, in stage 505 the user's initial search for documents about air quality is expanded by including a search for documents indexed according to narrower metadata terms—in this instance the terms particulate emissions, ozone and smog in stage 510. These additional metadata terms are then matched with the data records in the data record database 105 at stage 515 such that the addresses of documents indexed according to either air quality, particulate emissions, ozone or smog will all be returned to the user. In some cases, the actual documents (electronic) or links to those documents will also be returned to the user.

In some embodiments of the present invention, the user can combine expanded searches of metadata terms with full text searches to find documents indexed according to the controlled metadata terms which also include specific words including variant usages. In FIG. 6, at stage 605, a user interested in researching information about the environmental impact of constructing a retail development (including a pharmacy) on rush hour traffic searches for documents indexed according to the non-controlled terms "traffic jam," "rush hour" and "pharmacy" with geographic parameters to narrow the search to a specific region 605. The user further specifies that narrower metadata terms should be included in the search, and that terms with no metadata equivalents may be used to search the full text of available documents. As in the earlier example in stage 610, the term "traffic jam" is translated to the controlled metadata term transportation and traffic along with narrower terms which include level of service 610, an indication of congestion. In addition, the terms "rush hour" and "pharmacy" are used to search the text of available documents. A document matching these requirements, indexed according to the metadata term level of service and containing the terms "rush hour" and "pharmacy" in the text is returned to the user in stage 615.

FIG. 7 shows an example screen of the type in which the user can enter various search terms and other parameters concerning the desired information (e.g. location and date of data). In some embodiments of the present invention, the user interface 140 includes a series of displayed text boxes in which the user enters various types of search information, organized by category. When the user enters one or more terms describing the type of document sought or the type or subject of the environmental information in box 725, a menu of candidate search metadata search terms is provided in box 730. When the user selects one or more of the candidate metadata terms by highlighting and clicking on the candidate term, that metadata term is automatically added to the search terms in box 735. A user can also specify a location and range in box 710 and a date range in box 715. Searching with metadata and/or thesaurus terms can be selected in box 705 and the results can be prioritized or organized according to user input in box 720.

FIG. 8 shows an example screen, of the type in which the user would receive the desired information about returned documents. The search history section 805 shows the search parameters used, including location information 810 and date parameters 815. The order in which results are specified to be returned are shown in box 820, while the data records associated in database 105 are listed in box 830. Selecting an individual returned document will reveal the specific metadata terms 115 that match the returned document in box 825. The first page of the first or selected record image is shown in section 835. Finally, a description of the first or selected identified document according to Dublin core or other appropriate document metadata is in section 840. In some embodiments of the present invention, the list of data records is prioritized according to the number of search terms associated with the records. In some alternative embodiments of the present invention, the list of data records is prioritized according to the modifiers associated with the metadata indicating the degree of importance of an associated metadata term to the content of the data record. In a further embodiment of the present invention, the list of data records includes an abstract summarizing each data record. In some alternative embodiments of the present invention, each data record in the list is linked to the location on the network indicated by its address such that selecting an electronic data record automatically brings the data record to the user's computer.

Embodiments of the invention allow the user to define a thesaurus terms from an external vocabulary as equivalent to a metadata term from the controlled vocabulary by selecting it from a list of terms displayed on the computer and subsequently selecting the corresponding thesaurus term. As shown in FIG. 9, the non-standard term "near-extinct," 910 may be considered as equivalent to the metadata term endangered species 920 which is a "narrow term" with respect to the metadata term special status species 925. As such, an expanded search on endangered species specified for "broad terms" will include all documents indexed under either endangered species or special status species 915. As further shown in the relationships included in 905, the term special status species is also a broad term with respect to the metadata terms rare species 935 and *O. tshawytscha* 940, and is itself a narrow term with respect to the broader term biological resources 930.

The reviewer is able to relate at thesaurus term to a metadata term through an appropriate screen as shown in FIG. 10. For example, by selecting the non-standard term "near-extinct" in box 1005 and dragging a cursor to extend an arrow to the metadata term endangered species in box 1010 he reviewer can establish an equivalence relationship between the two terms which is illustrated with other hierarchical relationships in Box 1015.

Embodiments of the invention allow reviewers to assign metadata to a data record to facilitate future access. As illustrated in FIG. 11, a reviewer analyzes the target document in step 1105 and selects a list of appropriate metadata terms to characterize its content in step 1110 including but not limited to thematic terms as wells as location, date and species referenced in the document. The reviewer then determines the appropriate document attributes to characterize the document, including its unique, unambiguous address in step 1115, and selects appropriate metadata terms to characterize the content of the document from controlled a vocabulary in step 1110. The reviewer then links the metadata with the data record address in the data record database in step 1120. The linked information is thereupon entered at step 1125 into the data record database 105, or else the reviewer returns to the metadata list at step 1110 to determine more appropriate metadata links. In the event that no appropriate metadata are found, a new metadata term may be associated with the data record and entered into the controlled vocabulary at step 1130.

In some embodiments of the present invention, all or part of an electronic record is displayed on a computer screen with one or more text boxes for entry of metadata. FIG. 12 illustrates an example screen 1205 in which a document title page is displayed 1210 adjacent to a selection of boxes for entering metadata pertinent to the entire document (e.g. Dublin Core metadata) 1215. The user enters the metadata in the appropriate text box, or selects from a dropdown menu of metadata terms, which are automatically entered in the textboxes. When the metadata entry for a given record is complete, the data record address is automatically entered in the database (with additional user-guided instructions) associated with the selected metadata.

In some alternative embodiments of the present invention, a similar procedure is provided for entering various types of metadata specific to different locations within the document. As illustrated in FIG. 13, the example screen 1305 includes an information tree, table of contents, bookmarks or similar method for navigating an electronic document 1310. Selection of location within this navigation screen brings up corresponding text from within the document 1315. The example screen simultaneously displays various categories of example metadata terms 1320 which can be selected through a series of dropdown menus; in addition, the user may enter other metadata terms directly in the "Current List of Assigned Metadata Terms" 1330. Another portion of the example screen displays the common document metadata entered earlier as shown in FIG. 12 as document properties 1325. When the user hits the return key, both the data record address and the metadata terms listed in box 1330 are associated together and entered in the metadata database 105.

In a further embodiment of the present invention, the user enters a description of the subject document, or a description of the type of environmental information contained in it, and a menu of candidate metadata terms or values to characterize the document is provided. The user can then select one or more candidate terms to associate with the document address (refer to FIG. 7).

FIG. 14 illustrates some alternative embodiments of the present invention in which the assignment of metadata is accomplished automatically by means of an automatic parsing agent 1400. By initiating the parsing agent 1405 the reviewer allows the agent to retrieve the target document 1410 and analyze it for metadata terms and other significant words 1415 according to their frequency and use in headings and elsewhere. These words are then compared against a list of available metadata terms 1420, and based on the results of the target document evaluation, a list of candidate terms is offered for assignment to the document 1425. The candidate terms are weighted according to the frequency of their occurrence 1435 and usage or according to some other predetermined standard 1430, and selected terms are then approved for use with the documents and associated with the data record address of the target document in the data record database 1435. Appropriate addresses may consist of its location in an electronic file, or a specific element within the file, or the physical location of a non-electronic data record. In a further embodiment of the present invention, metadata terms are assigned automatically to the data records based on the frequency with which the metadata terms or the thesaurus equivalents occur within the metadata record.

In a further embodiment of the present invention, document analysis consists of evaluating the text of the document for available terms, or by identifying the presence of available terms in the title and headings or by other means to determine its significance for the purpose of assigning appropriate metadata terms to characterize the document.

What is claimed is:

1. A computer processor-implemented method for accessing environmental information, comprising the steps of:
    (a) receiving first environmental information regarding a proposed environment-modifying project, including information about project information, setting information, impact information, or mitigation information, wherein project information comprises information about an environment-modifying natural event or construction project; wherein setting information comprises information about a natural, constructed or socioeconomic feature in the area of the project; wherein impact information comprises information about a change to the setting brought about by the project; and wherein mitigation information comprises information about a feature designed to ameliorate a potential environmental impact of the project;
    (b) automatically associating at least some of the first environmental information within a source of information with metadata, including some interrelated project information, setting information, impact information, and mitigation information, wherein the metadata is selected from a controlled vocabulary or a user-defined vocabulary to characterize the first environmental information, at least some of the terms of metadata existing in an electronic thesaurus, wherein the electronic thesaurus comprises equivalent terms;
    (c) receiving a request from a computer for requested environmental information in the form of a search term, specific value or other user-specified indicator, the requested information being the first environmental information or any information associated with metadata or other information derived at least in part from the first environmental information;
    (d) relating the search term, specific value or other user-specified indicator to the metadata in the electronic thesaurus to facilitate identification of responsive sources of information corresponding to the requested environmental information;
    (e) identifying the responsive sources of information corresponding to the requested environmental information; and
    (f) displaying a listing of a plurality of responsive sources of information indicators, with the order of the responsive sources of information indicators corresponding to a weighting of metadata terms associated with the responsive sources of information.

2. The method of claim 1 wherein the metadata specifies an attribute of project, setting, impact or mitigation.

3. The method of claim 1 wherein the metadata specifies a geographic location.

4. The method of claim 1 wherein the metadata specifies a scientific name.

5. The method of claim 1 wherein the controlled vocabulary contains terms of metadata and the terms of metadata are related to each other in the electronic thesaurus either hierarchically or incidentally by the relationship "used for".

6. The method of claim 1 wherein the electronic thesaurus contains place names related to latitude and longitude, or other geographic identifier.

7. The method of claim 1 wherein the electronic thesaurus contains common names of species related to the scientific names.

8. A system having a computer processor and memory for accessing environmental information from a user computer, comprising:
    an environmental database, the environmental database containing addresses to environmental information related to project information, setting information, impact information, or mitigation information: wherein project information comprises information about an environment-modifying event, the environment-modifying event including an environment-modifying natural event or construction project; wherein setting information comprises information about a natural, constructed or socioeconomic feature in the area of the project; wherein impact information comprises information about a change to the setting brought about by the project and wherein mitigation information comprises information about a feature designed to ameliorate a potential environmental impact of the project;
    a metadata database, the metadata database containing a controlled vocabulary or a user defined vocabulary of metadata terms associated with the addresses, wherein the controlled vocabulary contains terms of metadata and an electronic thesaurus relates one metadata term to search terms, specific values or other user-specified indicators, wherein the electronic thesaurus comprises equivalent terms, the metadata being associated with at least some of the environmental information within a source of information with metadata, including some interrelated project information, setting information, impact information, and mitigation information, wherein the metadata is selected from the controlled vocabulary or a user-defined vocabulary to characterize the environmental information; and
    a user interface, the user interface adapted to receive a search term from the user computer and applying the search term to the metadata database with weighted metadata.

9. The system for accessing environmental information from the user computer of claim 8 wherein the user interface directly applies the search term to the metadata database.

10. The system for accessing environmental information from the user computer of claim 8 wherein the user interface indirectly applies the search term to the metadata database.

11. The system of claim 8 wherein the metadata specifies an attribute of project, setting, impact or mitigation.

12. The system of claim 8 wherein the metadata specifies a scientific name.

13. The system of claim 8 wherein the metadata specifies a geographic location.

14. The system of claim 8 wherein a controlled vocabulary contains terms of metadata and the terms of metadata are related to each other either hierarchically or incidentally, by the relationship "used for".

15. The system of claim 8 wherein the controlled vocabulary contains terms of metadata and an electronic thesaurus relates one metadata term to search terms, specific values or other user-specified indicators, wherein the electronic thesaurus comprises equivalent terms.

16. The system of claim 15 wherein the request for environmental information further comprises a keyword, specific value or other user-specified indicator which is related by the electronic thesaurus to a metadata.

17. The system of claim 15 wherein the electronic thesaurus contains place names related to latitude and longitude, or other geographic identifier.

18. The system of claim 15 wherein the electronic thesaurus contains common names of species related to scientific names.

19. The computer-implemented method of claim 1, further comprising:

(g) retaining a history of the computer-implemented method for searching environmental information.

* * * * *